May 26, 1942. T. MULERT ET AL 2,284,337
SAW-TOOTH CURRENT GENERATOR
Filed March 11, 1940
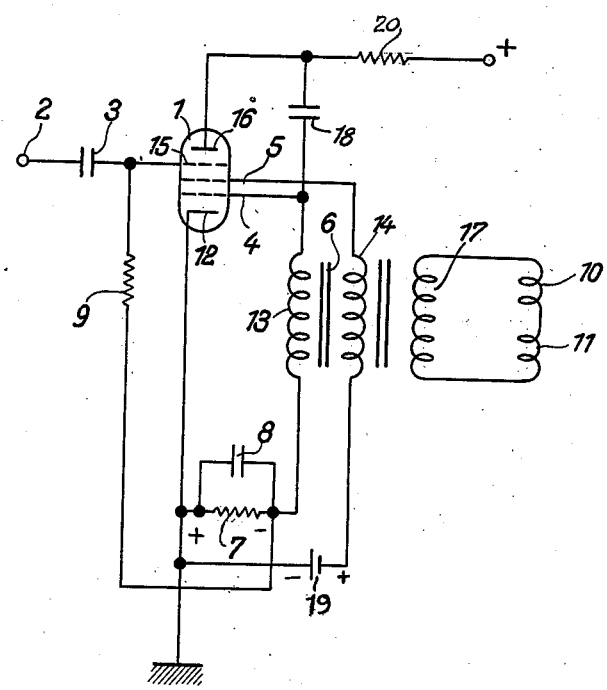
Inventors
THEODOR MULERT
FRITHJOF RUDERT
BY
ATTORNEY Patented May 26, 1942

2,284,337

UNITED STATES PATENT OFFICE 2,284,337

SAW-TOOTH CURRENT GENERATOR

Theodor Mulert and Frithjof Rudert, Berlin-Zehlendorf, Germany, assignors to Fernseh G. m. b. H., Berlin-Zehlendorf, Germany Application March 11, 1940, Serial No. 323,348
In Germany March 11, 1939

4 Claims. (Cl. 250—36)

This invention relates to saw-tooth current generators, particularly for television apparatus in which the saw-tooth current is produced for deflecting the cathode ray of a cathode ray tube. The invention is particularly concerned with deflecting circuits containing a thermionic tube in combination with a transformer having coils connected to the anode and grid circuits of the tube.

It is an object of the invention to provide a scanning-current generator of low energy consumption and simple construction. It is a further object to insert into the grid circuit of the generator tube an element producing not only the biasing potential for the oscillator tube but also serving simultaneously another purpose in the arrangement. It is a further object to devise the circuit in such a manner that the generator is easily synchronized by impulses impressed upon a synchronizing element, particularly a synchronizing electrode. This synchronizing electrode may be arranged within the oscillator tube or within a separate synchronizing tube connected to the generator tube.

According to the invention the grid circuit of the generator tube contains a resistor for producing a biasing potential for the generator tube. A condenser is arranged in parallel with this resistor. A negative potential is taken off at one terminal of the resistor and supplied as biasing potential to the grid of the synchronizing system. It is preferable to arrange the synchronizing system within the generator tube. This tube contains for instance three grids, the first two of which as seen from the cathode operate in the usual manner as a saw-tooth current generator while the third grid and the anode operate as a synchronizing amplifier system. In such an arrangement it is necessary that the synchronizing system be blocked during the working period of the saw-tooth oscillator in order to be free of reaction. The blocking of the tube requires a negative potential of considerable amplitude. This negative biasing potential is derived from the grid resistor of the generator system.

Further particulars and advantages of our invention will be described in connection with the drawing showing by way of example an embodiment of the invention.

The single figure shows a scanning-current generator in which a multigrid tube 1 co-operates with a transformer 6. The tube has a cathode 12 which is preferably grounded, a first grid 4 connected to a winding 13 of the transformer, a second grid 5 connected through another winding 14 of the transformer to the positive terminal of a source of potential 19, a synchronizing grid 15 and an anode 16. An output winding 17 of the transformer is connected to deflecting coils 10 and 11 of a cathode ray tube, not shown. The grid coil 13 of the transformer is connected to a resistor 7, a condenser 8 being connected in parallel with this resistor. The terminal of the resistor 7 towards the grid coil is connected by way of a resistor 9 to the synchronizing grid 15. This grid is connected by way of a condenser 3 to a source 2 of synchronizing impulses. The anode 16 is connected through a load resistor 20 to the positive terminal of a source of potential, and to the saw-tooth oscillator grid 4 by way of a condenser 18. The electrodes 12, 4 and 5 in connection with the coupled windings of the transformer operate as a scanning-current generator.

During the operation a negative potential is produced between ground and the junction of resistor 7 and grid coil 13 due to the flow of grid current in the saw-tooth oscillator circuit. This potential is applied to synchronizing grid 15 so that this grid prevents a current from flowing to the anode 16 except at the times when positive synchronizing impulses are applied by way of the condenser 3 compensating and overcome the negative biasing potential. Thus, in the absence of a synchronizing pulse, the synchronizing amplifier portion of the tube 1 is blocked and cannot interfere with the normal operation of the saw-tooth scanning generator. When a positive synchronizing pulse is received, however, the negative potential on the grid 15 is overcome, anode current flows, and the anode 16 suddenly becomes less positive due to the increased potential drop in the resistor 20. This voltage change is applied to the grid 4 by way of the condenser 18 to control the operating frequency of the scanning-current generator.

The negative potential derived from the grid circuit can be used not only for the synchronizing system of the same scanning-current generator but also for the synchronizing system of a second separate scanning-current oscillator. If the generator represented in the figure is used for producing the line deflecting current the negative potential may also be fed to the synchronizing grid of the frame deflecting current generator, so that both scanning current generators receive their biasing potential from a single source of potential.

The invention is not limited to the example represented in the drawing. The tube 1 may contain additional grids or, in case separate tubes are used, each tube may contain additional grids and fulfill additional functions. The saw-tooth current generator may also be used for producing an anode potential for the cathode ray tube. The operation of the arrangement according to the invention is not influenced thereby.

We claim:

1. A saw-tooth current generator comprising a vacuum tube having a cathode and a plurality of control electrodes, a transformer having a plurality of windings, a resistance-capacitance parallel network connected in series with a first of said windings between said cathode and the first of said control electrodes, a source of potential connected in series with a second of said windings between said cathode and the second of said control electrodes, and a connection from the junction of said network with said first winding to the third of said control electrodes.

2. A saw-tooth current generator comprising a vacuum tube having a cathode and a plurality of control electrodes, a transformer having a plurality of windings, a resistance-capacitance parallel network connected in series with a first of said windings between said cathode and the first of said control electrodes, a source of potential connected in series with a second of said windings between said cathode and the second of said control electrodes, a connection from the junction of said network with said first winding to the third of said control electrodes, and a source of synchronizing impulses connected to said third control electrode.

3. A saw-tooth current generator comprising a vacuum tube having a cathode, a plurality of control electrodes, and an anode; a transformer having a plurality of windings; a resistance-capacitance parallel network connected in series with a first of said windings between said cathode and the first of said control electrodes; a first source of potential connected in series with a second of said windings between said cathode and the second of said control electrodes; a connection from the junction of said network with said first winding to the third of said control electrodes; a resistor connected between said anode and a second source of potential; and a condenser connected between said anode and said first control electrode.

4. A saw-tooth current generator comprising a multi-grid tube, a transformer, a first winding in said transformer connected to the first grid of said tube, a second winding connected between the second grid of said tube and a source of potential, a biasing resistor between said first winding and the cathode of said tube, a condenser in parallel with said biasing resistor, the grid terminal of said resistor being connected to the third grid of said tube, and a source of synchronizing impulses connected to said third grid.

THEODOR MULERT.
FRITHJOF RUDERT.

CERTIFICATE OF CORRECTION.

Patent No. 2,284,337. May 26, 1942.

THEODOR MULERT, ET AL.

It is hereby certified that error appears in the printed specification of the above numbered patent requiring correction as follows: Page 1, second column, line 26, for "compensating and overcome" read --and compensate--; and that the said Letters Patent should be read with this correction therein that the same may conform to the record of the case in the Patent Office.

Signed and sealed this 15th day of September, A. D. 1942.

(Seal)

Henry Van Arsdale,
Acting Commissioner of Patents.